United States Patent [19]

Ortiz, Jr.

[11] Patent Number: 4,958,900
[45] Date of Patent: Sep. 25, 1990

[54] MULTI-FIBER HOLDER FOR OUTPUT COUPLER AND METHODS USING SAME

[75] Inventor: Angel L. Ortiz, Jr., Scotia, N.Y.

[73] Assignee: General Electric Company, Schenectady, N.Y.

[21] Appl. No.: 329,159

[22] Filed: Mar. 27, 1989

[51] Int. Cl.⁵ .............................................. G02B 6/32
[52] U.S. Cl. .............................. 350/96.18; 350/96.20
[58] Field of Search ........................... 350/96.18, 96.20

[56] References Cited

U.S. PATENT DOCUMENTS

| | | | |
|---|---|---|---|
| 3,620,603 | 11/1971 | White et al. | 350/96.350 |
| 4,531,810 | 7/1985 | Carlsen | 350/96.18 X |
| 4,707,073 | 11/1987 | Kocher | 350/96.18 X |
| 4,718,744 | 1/1988 | Manning | 350/96.20 |
| 4,732,450 | 3/1988 | Lee | 350/96.18 |
| 4,744,627 | 5/1988 | Chande et al. | 350/96.20 |
| 4,753,521 | 6/1988 | Deserns | 350/96.18 X |
| 4,799,755 | 1/1989 | Jones | 350/96.18 |
| 4,834,488 | 5/1989 | Lee | 350/96.20 |

FOREIGN PATENT DOCUMENTS 58-178312 10/1983 Japan .

Primary Examiner—William L. Sikes
Assistant Examiner—Phan T. Heartney
Attorney, Agent, or Firm—John S. Beulick; James C. Davis, Jr.; Paul R. Webb, II

[57] ABSTRACT

A holder for use with a plurality of optical fibers that illuminate a workpiece has a central bore through which the fibers extend. Screws and springs are used to adjust the orientation of the fibers with respect to each other in order to achieve different illumination patterns on the workpiece. Instead of the screws, motor driven micrometer shafts and wedges can be used. A method of processing a workpiece comprises adjusting the orientation of a plurality of optical fibers to obtain a selected illumination pattern on the workpiece, and illuminating the workpiece with high power laser beams eminating from the fibers.

19 Claims, 6 Drawing Sheets

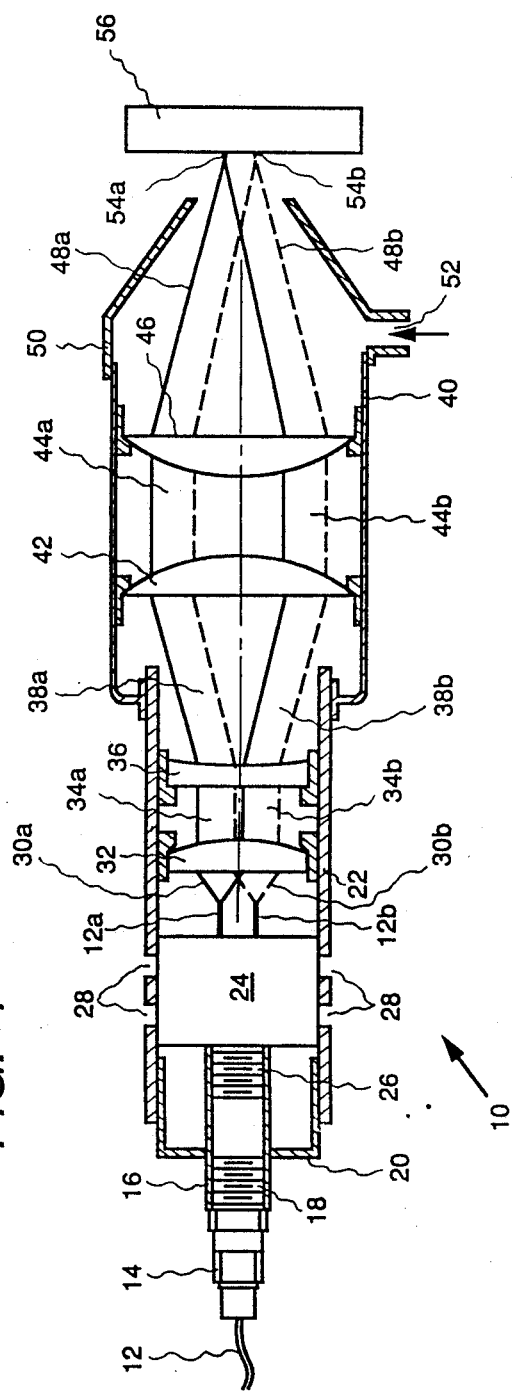
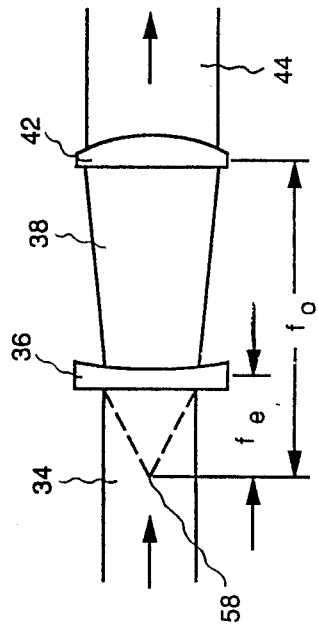
FIG. 1
FIG. 2

MULTI-FIBER HOLDER FOR OUTPUT COUPLER AND METHODS USING SAME

RELATED APPLICATION

The present application is related to commonly assigned, copending U.S. Patent Application Ser. No. 07/329,137, entitled "Lensless Multifiber Output Coupler", allowed Jan. 11, 1990.

BACKGROUND OF THE INVENTION

The present invention relates to a holder for a plurality of optical fibers, and more particularly, to such a holder wherein the orientation of the fibers with respect to each other can be adjusted.

Light from a laser can be used to perform industrial processes, e.g., drilling, welding, soldering, etc. To this end, a plurality of optical fibers that convey the laser light are held at the workstation near the workpiece by a holder such as shown in U.S. Pat. No. 4,744,627. However, such a holder holds the fibers parallel to, and at a fixed distance, from each other. Many types of industrial processes require that the spacing between the fibers, as well as the angle between the fibers, be adjustable.

It is, therefore, an object of the present invention to provide a holder for a plurality of optical fibers that allows adjustment of the spacing and angle between the fibers and a method for using the holder.

SUMMARY OF THE INVENTION

A holder for use with a plurality of optical fibers illuminating a workpiece comprises a body having a central bore for receiving the fibers; and means, disposed in said bore, for engaging the fibers and for adjusting the orientation of the fibers with respect to each other.

A method of processing a workpiece comprises adjusting the mutual orientation of a plurality of optical fibers; and illuminating the workpiece with high power laser energy from said fibers.

DESCRIPTION OF THE DRAWING

FIG. 1 shows a cross-sectional view of a coupler using the holder of the invention;

FIG. 2 is a schematic diagram of a telescope used in FIG. 1;

FIG. 4A is a cross-sectional view of a first embodiment of a coupler used in FIG. 1, while

In the drawing corresponding elements have been given corresponding reference numerals.

DETAILED DESCRIPTION

Figure 3A:
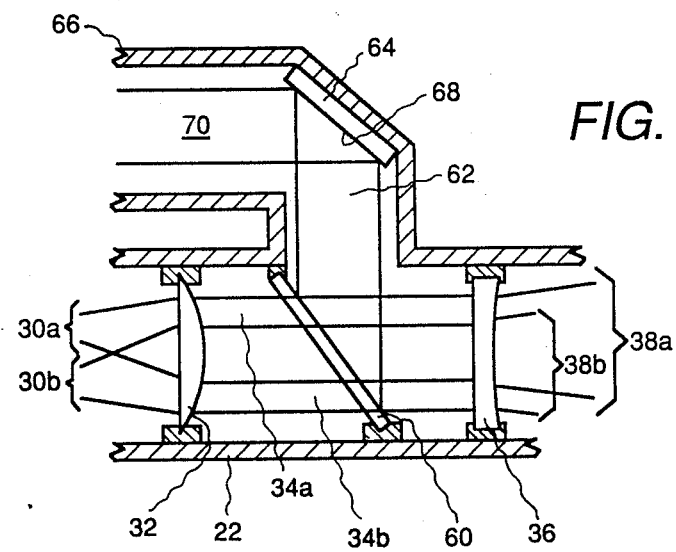
FIGS. 3A and 3B are cross-sectional views showing modifications of the fiber output coupler of FIG. 1.

In FIG. 1 is a holder generally designated 10. A plurality of step index optical fibers 12, typically with a quartz core and a polymer or glass cladding surrounded by steel armor cable, are received by armor cable terminator 14. The fibers 12 convey high power laser beams, typically between 0.5 to 1.5 kilowatts, from any type of solid state or gas laser with wavelengths ranging from infrared (2 $\mu$m) to ultraviolet (193 nm). In turn, an end cap 16 receives the terminator 14 in interior threads 18. Shoulder 20 of end cap 16 is received in a cylindrical first barrel section 22. A cylindrical fiber holder 24 (described in detail below) has an extension (not shown) that is received by threads 26. Holes 28 are disposed in barrel section 22 for providing access to adjustable set screws (described below). The fibers 12 extend through end cap 16 and holder 24. While only two such fibers 12a and 12b are shown, there can be more. The tips at both ends of fibers 12 are preferably prepared as shown in U.S. Pat. Nos. 4,676,586 and 4,681,396 to prevent damage to the cladding thereof by the injected and emitted high power laser energy. The diverging beams 30a and 30b from the fibers 12a and 12b, respectively, strike plano-convex collimating lens 32 and, thus, respectively form collimated beams 34a and 34b. In turn, beams 34a and 34b strike plano-concave diverging lens 36 and, thus, respectively form diverging beams 38a and 38b. Lenses 32 and 36 typically have a diameter of about 1 inch (2.54 cm).

A second cylindrical barrel section 40 fits over the first barrel section 22 and has therein a plano-concave converging lens 42 that receives the beams 38a and 38b to respectively produce the collimated beams 44a and 44b. Lenses 36 and 42 together comprise a Galilean Telescope (described below). The beams 44a and 44b strike a plano-convex focussing lens 46 to respectively produce converging beams 48a and 48b. Typically, lenses 42 and 46 have a diameter of about 2 inches (5.08 cm). A nozzle 50 fits over second barrel section 40 and receives at inlet 52 a process assist gas, e.g., $O_2$, He, Ar, $N_2$, etc., to prevent the lens 46 from being splattered by material from the workpiece and to aid in the material processing. The exact gas selected depends upon the process being performed, as known in the art. The beams 48a and 48b respectively focus at spots 54a and 54b on a workpiece 56. Other illumination patterns (described below) are possible. The lenses 32, 36, 42, and 46 are made by CVI Laser Corp., Alberquerque, N. Mex. The end cap 16, the barrel sections 22 and 40, and nozzle 50 are preferably made of a material that is dimensionally stable with changes in temperature such as type MIG-6 aluminum. If desired, the lenses 36 and 42 can be eliminated. Then the barrel sections 22 and 40 could be of one piece construction with a constant diameter.

FIG. 2 shows the Galilean telescope comprising the lenses 36 and 42, which have a common focal point 58. The lens 36 is a distance -fe from point 58, the minus sign indicating that lens 36 is a negative lens. The lens 42 is a distance $f_0$ from point 58 and thus the expansion factor for the telescope is $f_0 / |-fe|$. The laser beam divergence will be reduced by the reciprocal of the expansion factor, and thus, so will the size of spots 54a and 54b.

Figure 3B:
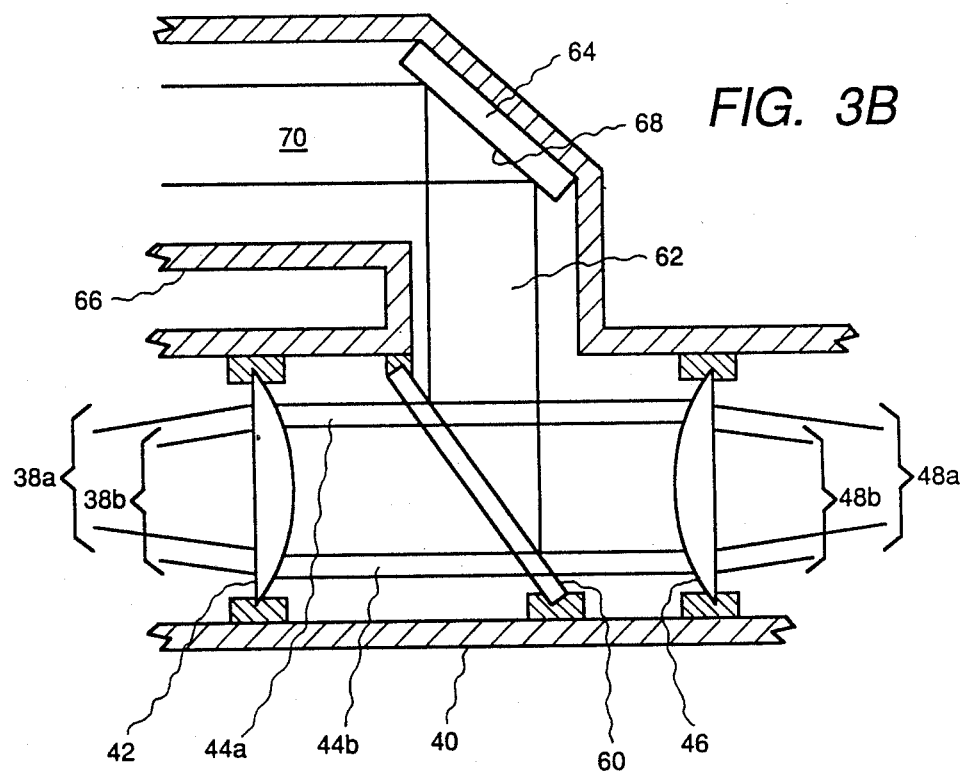

Frequently, it is desired to monitor such parameters as laser beam diameter and position and beam tracking as part of a closed loop processing system. In order to do this, a monitoring camera is used. FIGS. 3A and 3B show modifications of the coupler of FIG. 1 to permit a monitoring camera to observe the process and to allow monitoring of the laser beam profiles on the material. In FIG. 3A a mirror 60 is placed in first barrel section 22 at a 45 degree angle to the longitudinal axis thereof between the lenses 32 and 36. Mirror 60 is coated on both faces for 100% transmission of the high power beams 34a and 34b. However, a very small portion of the beam 34 is reflected to form the beam 62. Beam 62 is incident upon a mirror 64 mounted at a 45 degree angle to the beam 62 in an image portion 66 of the first barrel section 22. The mirror 64 has its inner face 68 coated with a 100% antireflection coating. A small amount of the beam 62 is reflected to form the beam 70. The small amount of light in the beam 70 is sufficient given the sensitivity of a typical CCD camera. Such a camera (not shown) can be mounted in the image portion 66 with beam 70 incident on the front thereof, or, alternatively, optical fibers (not shown) can be mounted with one of their ends in portion 66 facing mirror 64, and their remote ends adjacent a front of the CCD camera.

FIG. 3B shows an arrangement similar to FIG. 3A except that the mirror 60 is disposed in second barrel section 40 between lenses 42 and 46 thereby intercepting the beams 44a and 44b. The operation is otherwise identical. In FIGS. 3A and 3B the portions of the coupler 10 that are not shown are identical to that shown in FIG. 1. It will be seen that in FIGS. 3A and 3B mirrors 60 and 64 and image portion 66 comprise a means for diverting a portion of light in the respective sections for monitoring purposes.

Figure 4A:
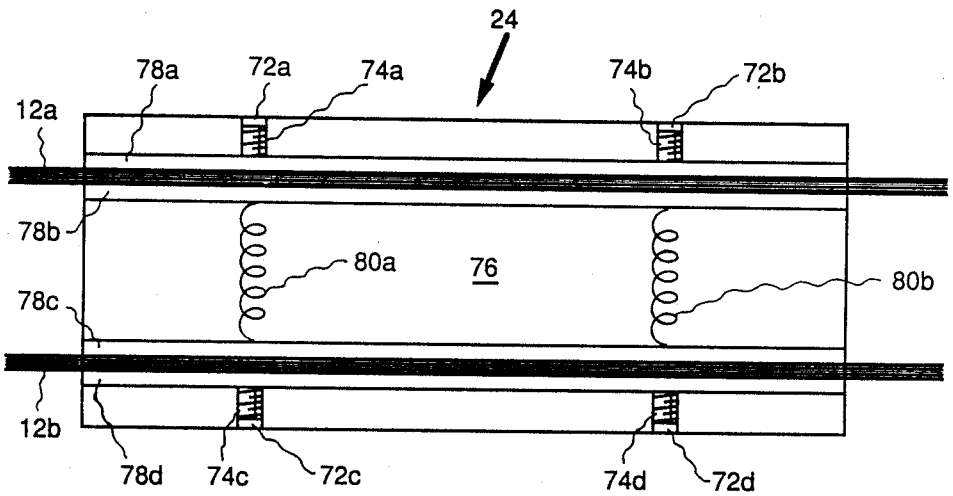

FIG. 4A shows the details of holder 24 of FIG. 1, which can be made of a sythetic resin material such as sold under the trademark "Plexiglass", and comprises a plurality of threaded holes 72a, 72b, 72c, and 72d respectively having set screws 74a, 74b, 74c, and 74d therein. Holder 24 also comprises a circular longitudinal bore 76 through which the fibers 12a and 12b of between about 100 to 1000 μm diameter extend. Other shapes, e.g., square, rectangular, etc., can be used for the cross-section of bore 76. Buffer plates 78a and 78b, such as quartz of 1 mm thickness, are disposed on either side of fiber 12a to prevent mechanical damage to fiber 12a. Plate 78a contacts the screws 74a and 74b. Similarly, buffer plates 78c and 78d are on either side of fiber 12b with plate 78d engaging the screws 72c and 72d. Means for urging the fibers 12a and 12b apart, such as springs 80a and 80b, are disposed between plates 78b and 78c and aligned with the holes 70 although this alignment is not necessary. The screws 74 can be adjusted using a screwdriver inserted through the respective holes 28 in the first barrel section 2 of FIG. 1. It will be appreciated that both the distance and angle between the fibers 12 can be selected by appropriate settings of screws 74.

Figure 4B:
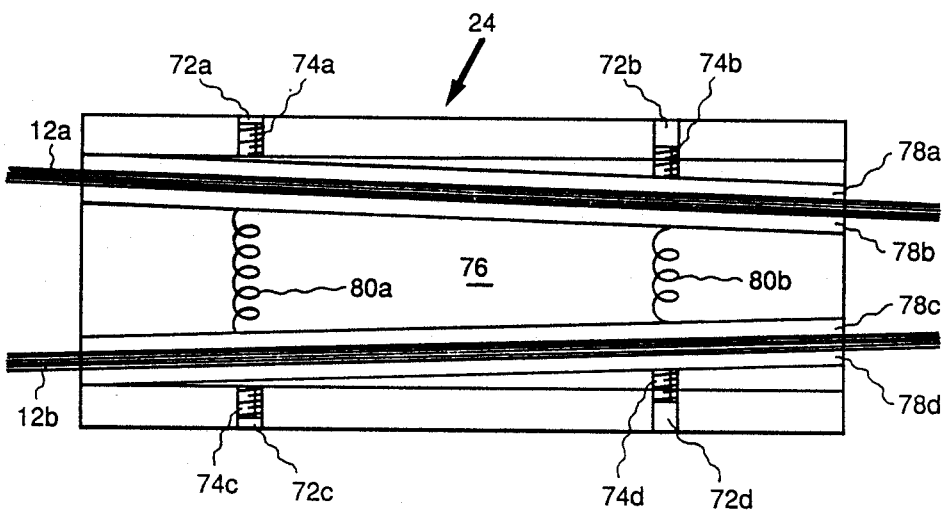
FIG. 4B shows a particular orientation of optical fibers in the holder of FIG. 4A.

This can be seen in FIG. 4B wherein the set screws 74a and 74c slightly project from the holes 72a and 72c into bore 76, while screws 74b and 74d project from holes 72b and 72c into bore 76 to a greater extent. The result is that both the distance and angle between the fibers 12a and 12b appreciably differ from that of FIG. 4A at the right hand side of the holder 24 and to lesser extent at the left hand side thereof.

Figure 5A:
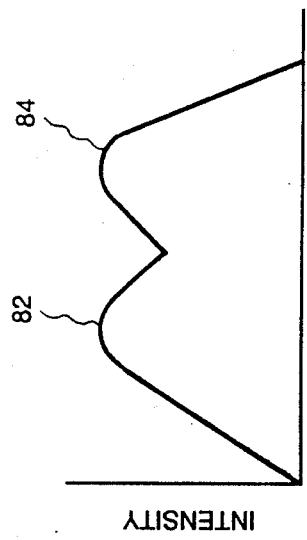
FIGS. 5A, B, C, and D are graphs of beam intensity verses beam diameter for various optical fiber configurations of FIG. 4.
Figure 5B:
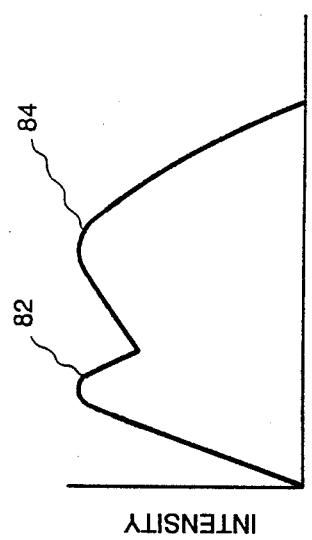
Figure 5C:
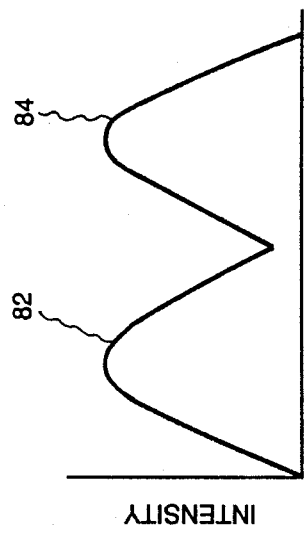
Figure 5D:
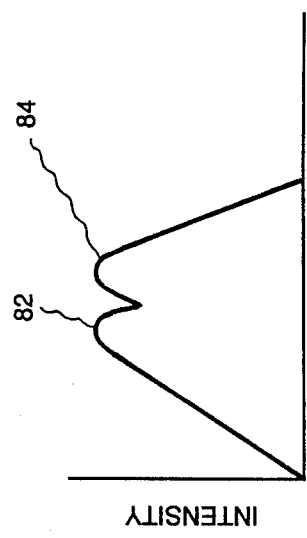

FIG. 5A shows beam intensity verses beam diameter for the setting of holder 24 shown in FIG. 4A, i.e., fibers 12 furtherest apart. The peaks 82 and 84 are far apart. FIG. 5B shows that as the fibers 12 are brought closer together (FIG. 4B), so are peaks 82 and 84. When the fibers 12 are less than about one fiber diameter apart, the peaks 82 and 84 are almost coincident (FIG. 5C). In the configuration of FIG. 4B when one fiber, e.g., 12a, has a smaller diameter than the other fiber, e.g., 12b, then the peak 82 from fiber 12a has a smaller width than the peak 84 from fiber 12b, as shown in FIG. 5D. The fibers 12a and 12b can have the same or different numerical apertures.

Although only two fibers are shown, a greater number can be used. If, for example, three fibers are used, then the bore 76 instead of being circular in cross-section would have three slots spaced at 120 degree angles, each slot having a fiber and a pair of buffer plates, and, if four fibers are used, then the bore 76 would be "X" shaped with a fiber and a pair of buffer plates in each slot of the "X", etc.

Figure 6:
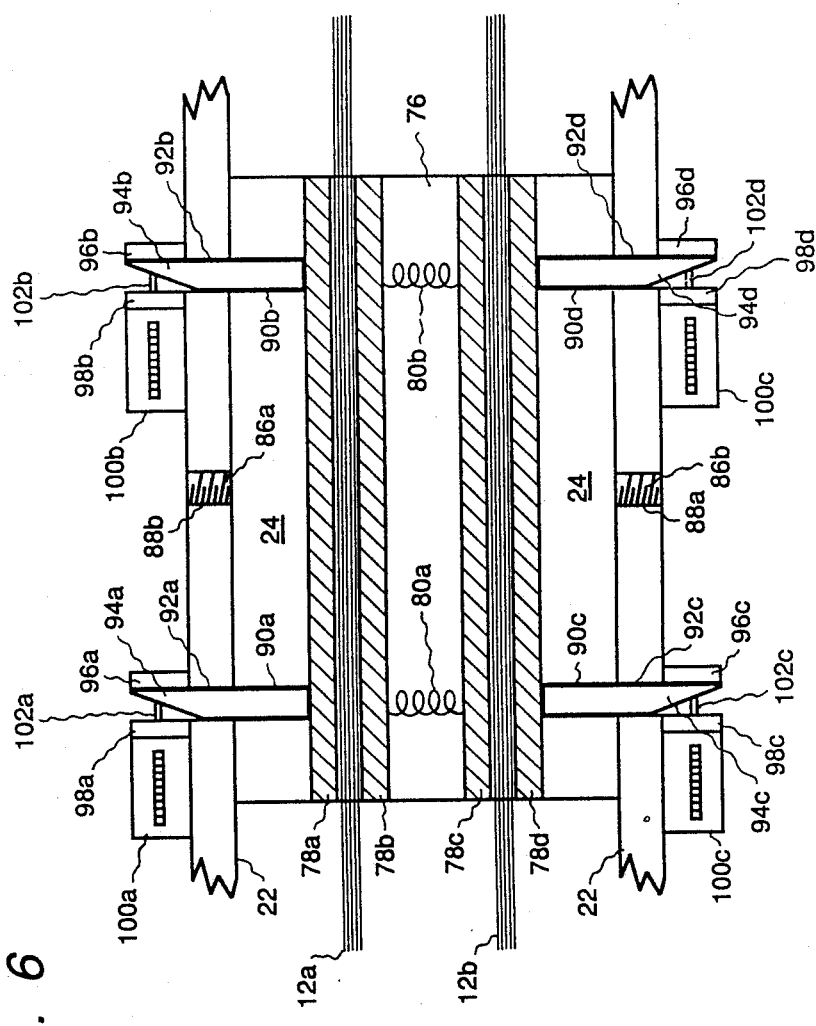
FIG. 6 is a cross-sectional view of a second embodiment of a holder.
Figure 7B:
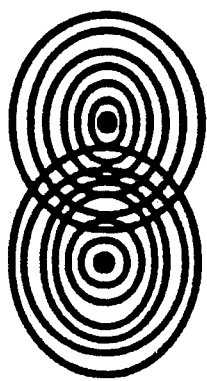
FIGS. 7A, B, C, and D are topographical maps of laser beam distributions on a workpiece corresponding to the intensity distributions of FIG. 5.
Figure 7D:
Figure 7A:
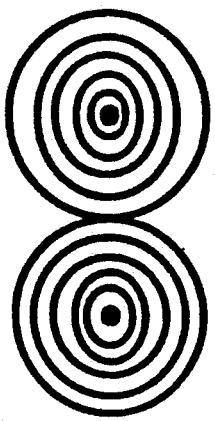
Figure 7C:
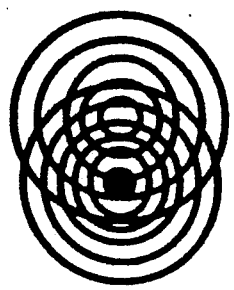

In the second embodiment of holder 24 shown in FIG. 6, holder 24, instead of being mounted on end cap 16, is mounted directly to the first barrel section 22 by means of set screws 86a and 86b respectively disposed in holes 88a and 88b, which screws 86 contact the holder 24. Such an arrangement can also be used in the first embodiment of FIG. 4. Holes 90a, 90b, 90c, and 90d in the holder 24 are respectively aligned with holes 92a, 92b, 92c, and 92d in the barrel section 22. Wedges 94a, 94b, 94c, and 94d extend in the holes 90a, 90b, 90c, and 90d, and 92a, 92b, 92c, and 92d, respectively. Wedges 94 can be made of aluminum or stainless steel. Wedge supports 96a, 96b, 96c, and 96d, such as aluminum, are mounted on the outside of the first barrel section 22 adjacent the respective holes 92a, 92b, 92c, and 92d. Opposing the supports 96 are mounts 98a, 98b, 98c, and 98d. If desired, supports 96 and mounts 98 can be made of the same aluminum as barrel section 22 and thus be made integral therewith. Motor driven micrometers 100a, 100b, 100c, and 100d have encoders and are respectively secured by the mounts 98a, 98b, 98c, and 98d and have spherically tipped shafts 102a, 102b, 102c, and 102d projecting therethrough to respectively engage wedges 94a, 94b, 94c, and 94d. The micrometers 100 can be type 18219 and be controlled by controller type 18011 with interface (not shown) both made by Oriel Corp., Stanford, Conn.

In operation, control signals are sent to micrometers 100 from the interface to cause a rotation of shafts 102. In turn, a vertical motion of wedges 94 occurs that changes the mutual orientation of fibers 12. The encoders (not shown) on micrometers 100 send signals to a computer (not shown) containing the location of shafts 102, and thus of fibers 12, for accurate control of their orientation. Micrometers 100 are on both sides of first barrel section 22 so that fibers 12 can be symmetrically displaced, as a symmetrical laser illumination pattern is required for many processes.

The laser beam distributions in topographical maps of FIG. 7 are produced when workpiece 56 is perpendicular to coupler 10. FIG. 7A is produced by the intensity distribution of FIG. 5A and can be used to simultaneously drill two holes. FIGS. 7B and C are respectively produced by the intensity distributions of FIGS. 5B and C and can be used to drill elliptical holes, FIG. 7B producing a hole with a greater eccentricity than FIG. 7C. FIG. 7D is produced by the distribution of FIG. 5D and shows how the holder of the invention can be used to drill uniquely shaped holes. The distribution can also be used to solder descrete components of various sizes.

It will be appreciated that other laser beam distributions can be achieved with workpiece 56 at other than a perpendicular angle to coupler 10. In fact, the present invention can be used within a 10 degree angle to the surface of the workpiece 56. When a single beam laser is used to weld, the tolerance of the fit between the welded pieces is small due to the small spot size. Since the present invention uses a plurality of laser beams, the spot size is larger, thereby increasing the fit tolerance. Multiple wavelengths of laser light can be used in soldering, e.g., a long wavelength, which can be generated at high powers, and a short wavelength, which can provide enhanced coupling to certain materials. During key hold welding, one of the fibers 12 can have a high power CW laser beam, while the remaining fibers can have a high power pulsed laser beam. Also the mutual orientation of the fibers 12 can be changed during cutting to change the kerf width. Cutting can be down either perpendicular to a line between two illumination spots or parallel thereto to allow a secondary method of changing the kerf width.

What is claimed is:

1. A holder for use with a plurality of optical fibers, each optical fiber including an output end portion and an output end, said holder comprising:
    a body having a central bore for receiving each fiber output end portion, said body including at least one hole; and
    means, disposed in said bore, for adjusting the orientation of at least one optical fiber output end portion with respect to each other optical fiber output end portion thereby adjusting the relative orientation of the output end of the one optical fiber relative to each other output end of each other optical fiber, said adjusting means comprising a screw disposed in said hole and extending into said bore and a spring disposed in said bore for urging the one fiber towards said screw whereby adjusting an extent to which said screw extends into said bore causes a change in the relative orientation of the one optical fiber output end.

2. A holder in accordance with claim 1 wherein said body includes a plurality of threaded holes, said adjusting means comprising a plurality of screws, each hole having one screw disposed therein, each screw engaging one fiber, and means for urging each fiber towards each screw engaging said fiber.

3. A holder in accordance with claim 2 wherein said urging means comprises a plurality of springs, one spring being disposed opposite each screw.

4. A holder in accordance with claim 2 further comprising a first plurality of plates disposed between each fiber and each screw engaging said fiber, and a second plurality of plates disposed between each fiber and each urging means in contact with said fiber.

5. A holder in accordance with claim 1 wherein said body includes a plurality of holes, said adjusting means comprising a plurality of motor driven micrometer shafts disposed outside said body, a plurality of wedges, each hole having one wedge disposed therein and each wedge engaging one of said fibers and one of said shafts, and means for urging each fiber towards each wedge engaging said fiber.

6. A holder in accordance with claim 5 wherein said urging means comprises a plurality of springs, one spring being disposed opposite each wedge.

7. A holder in accordance with claim 5 further comprising a first plurality of plates disposed between each fiber and each wedge engaging said fiber, and a second plurality of plates disposed between each fiber and each urging means in contact with said fiber.

8. A holder in accordance with claim 1 wherein at least one of said fibers has a different diameter than each of the remaining fibers.

9. A holder in accordance with claim 1 wherein at least one of said fibers has a high power pulsed laser beam being transmitted therethrough and each of the remaining fibers has a high power continuous wave laser beam being transmitted therethrough.

10. A holder in accordance with claim 1 wherein light being transmitted through at least one of said fibers is of a wavelength different from wavelengths of light being transmitted through each remaining fiber.

11. A holder in accordance with claim 1 wherein said adjusting means includes means for orienting each fiber whereby each fiber is adjusted to produce a separate illumination pattern on the workpiece.

12. A holder in accordance with claim 1 wherein said adjusting means includes means for orienting each fiber whereby each fiber is adjusted to produce an overlapping illumination pattern on the workpiece.

13. An output coupler comprising the holder of claim 1.

14. A coupler in accordance with claim 13 further comprising a Galilean telescope.

15. A coupler in accordance with claim 13 further comprising a collimating lens and a focussing lens.

16. A coupler in accordance with claim 13 further comprising first and second adjacent barrel sections, said holder being disposed in said first section.

17. A coupler in accordance with claim 16 further comprising a nozzle disposed on said second barrel section, said nozzle including an inlet means for receiving a process assist gas.

18. A coupler in accordance with claim 16 wherein said first barrel section comprises a means for diverting a portion of said high power laser beams being transmitted therethrough, said diverted portion of said laser beams being utilized for monitoring purposes.

19. A coupler in accordance with claim 16 wherein said second barrel section comprises a means for diverting a portion of said high power laser beams being transmitted therethrough, said diverted portion of said laser beams being utilized for monitoring purposes.

* * * * *